United States Patent [19]

Needham

[11] 3,880,805

[45] Apr. 29, 1975

[54] STABILIZED POLYOLEFIN COMPOSITIONS

[75] Inventor: Donald G. Needham, Bartlesville, Okla.

[73] Assignee: Phillips Petroleum Company, Bartlesville, Okla.

[22] Filed: June 17, 1970

[21] Appl. No.: 47,146

[52] U.S. Cl. .................. 260/45.95 F; 260/33.4 PQ; 260/45.95 L
[51] Int. Cl. ............................................ C08f 45/58
[58] Field of Search ........... 260/33.4 PQ; 260/45.95

[56] References Cited
UNITED STATES PATENTS

| | | | |
|---|---|---|---|
| 2,976,259 | 3/1961 | Hardy et al. .................... | 260/45.95 |
| 3,098,842 | 7/1963 | Armitage et al. ................ | 260/45.95 |
| 3,455,863 | 7/1969 | Williams ............................ | 260/33.4 |

OTHER PUBLICATIONS

*Compounding Ingredients for Rubber,* Third Edition, 1961, p. 193 & 194, published by Rubber World, editors, N.Y., N.Y.

*Primary Examiner*—V. P. Hoke

[57] ABSTRACT

Polyolefin compositions, stabilized against ultraviolet light decomposition by incorporation of stabilizers, are improved by the inclusion of glycerine which masks the color-effect of the stabilizer and improves the resistance to embrittlement of the resulting polyolefin composition.

4 Claims, No Drawings

STABILIZED POLYOLEFIN COMPOSITIONS

This invention pertains to stabilized polyolefin compositions.

In one of its more specific aspects, this invention pertains to adjuvants to polyolefin stabilizers.

Polyolefin compositions, such as polyethylene and polypropylene and related materials formed by olefin polymerizations, are widely used in outdoor installations, such as stadium seats, wall paneling and the like. In such service, these compositions undergo degradation, primarily from ultraviolet light. To minimize such degradation, certain compounds, commonly known as UV stabilizers have been developed for incorporation in the polyolefins.

While such stabilizers are reasonably effective, a totally-effective stabilizer has not as yet been discovered. Further, the incorporation of UV stabilizers in polyolefin compositions generally imparts to the composition, in spite of such pigments as it might also contain, certain color casts which are undesirable.

This invention solves this problem which is inherent in the use of conventional and commercial stabilizers.

According to this invention there is provided a method of color stabilizing thermoplastic compositions against ultraviolet light which involves incorporating in the thermoplastic composition an ultraviolet light stabilizer and glycerine in an amount of from about 0.75 to about 1.25 percent by weight of the final thermoplastic composition.

Also according to this invention there is provided a thermoplastic composition comprising an olefin polymer, an ultraviolet light stabilizer and glycerine, the glycerine being present in an amount from about 0.75 to about 1.25 percent by weight of the final thermoplastic composition, the ultraviolet light stabilizer being present in those amounts in which they are usually employed, that is, from about 0.05 to about 1.0 percent by weight of the thermoplastic composition.

The use of UV stabilizers in thermoplastics is well known. One of the most satisfactory of these is a composition in which the effective agent is 2-hydroxy-4-n-octoxybenzophenone. However, this stabilizer imparts a yellow coloration to the thermoplastic; this yellow color tends to offset the effect of those pigments which are incorporated in the thermoplastic. However, incorporation of the glycerine suppresses this color-effect of the stabilizer. Additionally, incorporation of the glycerine improves resistance to embrittlement as shown by the residual elongation results of the following test. This is wholly unexpected since glycerine, when used individually, does not exhibit stabilizing properties.

The stabilizing system comprised of the ultraviolet light stabilizer and the glycerine can be incorporated into the thermoplastic in any suitable manner which insures thorough dispersal therein. The two components of the system may be separately introduced into the thermoplastic or may be introduced thereinto as a mixture.

Two samples of a polymer composition were prepared. Sample 1 was comprised of an ethylene homopolymer of 0.945 density and 0.2 MI, 0.5 weight percent of a pigment, 0.0005 weight percent carbon black and 0.6 weight percent of the UV stabilizer 2-hydroxy-4-n-octoxybenzophenone.

Sample 2 was of identical composition except that it contained 1 weight percent glycerine.

Both samples were identically mixed and subjected to elongation tests after exposure to ultraviolet light by means of conventional methods.

Results were as follows:

| Hours on Test (Accelerated) | Tensile Strength, psi Sample 1 | Sample 2 | Elongation, % Sample 1 | Sample 2 | Color Sample 1 | Sample 2 |
|---|---|---|---|---|---|---|
| 0 | 3460 | 3420 | 545 | 570 | | |
| 1000 | 3625 | 3520 | 35 | 215 | | |
| 2000 | 3700 | 3550 | 27 | 40 | | |
| 3000 | 3250 | 3100 | 21 | 53 | | |
| 4000 | 3550 | 3650 | 5 | 34 | Severe Darkening | Unchanged |

These data indicate that the incorporation of the glycerine unexpectedly improved the resistance to embrittlement and therewith provided a definite supplementary effect to the UV stabilization provided by the 2-hydroxy-4-n-octoxybenzopphenone.

It will be apparent from the foregoing that various modifications can be made to the method and composition of this invention. Such, however, are considered within the scope of the invention.

What is claimed is:

1. A method of stabilizing a polymonoolefin composition which comprises incorporating in said composition a stabilizing system consisting essentially of 2-hydroxy-4-n-octoxybenzophenone and glycerine thereby forming a thermoplastic composition in which said 2-hydroxy-4-n-octoxybenzophenone is present in an amount of about 0.05 to about 1.0 percent by weight of the thermoplastic composition and said glycerine is present in an amount from about 0.75 to about 1.25 percent by weight of the thermoplastic composition.

2. A method of claim 1 wherein the monoolefin is ethylene.

3. A thermoplastic composition consisting essentially of a monoolefin polymer, 2-hydroxy-4-n-octoxybenzophenone present in an amount of about 0.05 to about 1.0 percent by weight of the thermoplastic composition and glycerine present in an amount of about 0.75 to about 1.25 percent by weight of the thermoplastic composition.

4. A thermoplastic composition of claim 3 wherein the monoolefin is ethylene.

* * * * *